(12) United States Patent
Jenkins

(10) Patent No.: US 9,420,833 B2
(45) Date of Patent: Aug. 23, 2016

(54) GARMENT, SYSTEM AND METHOD FOR USING THE SAME

(71) Applicant: CJ's Kids LLC, Alexandria, VA (US)

(72) Inventor: Cherlyn Jenkins, Alexandria, VA (US)

(73) Assignee: CJ'S KIDS LLC, Alexandria, VA (US)

(*) Notice: Subject to any disclaimer, the term of this patent is extended or adjusted under 35 U.S.C. 154(b) by 717 days.

(21) Appl. No.: 13/676,615

(22) Filed: Nov. 14, 2012

(65) Prior Publication Data
US 2014/0132055 A1    May 15, 2014

(51) Int. Cl.
| | | |
|---|---|---|
| *A41D 11/00* | (2006.01) | |
| *A41D 3/00* | (2006.01) | |
| *B60N 2/26* | (2006.01) | |
| *B60R 22/10* | (2006.01) | |
| *B60R 22/14* | (2006.01) | |
| *A41D 27/24* | (2006.01) | |

(52) U.S. Cl.
CPC .............. *A41D 11/00* (2013.01); *B60N 2/265* (2013.01); *B60R 22/14* (2013.01); *A41D 3/00* (2013.01); *A41D 27/24* (2013.01); *A41D 2400/46* (2013.01)

(58) Field of Classification Search
CPC . A41D 11/00; A41D 13/1245; A41D 13/129; A41D 13/1272; A41D 3/02; A41D 1/04; A41D 3/00; A41D 3/08; A41D 27/10; A41D 2300/30; A41D 15/00; A41D 1/02; A41B 1/10; A41B 2300/30; A41B 13/00; A41B 13/005; A41B 13/08; A41B 1/00; A47G 9/068; B60N 2/28; B60N 2/2812; B60N 2/26; B60N 2002/2815; B60N 2/265; B60R 22/105; B60R 22/14

USPC .............. 2/114, 70, 75, 111, 69, 69.5, 80, 85; 297/484, 250.1, 465
See application file for complete search history.

(56) References Cited

U.S. PATENT DOCUMENTS

| | | | | |
|---|---|---|---|---|
| 818,351 | A * | 4/1906 | Clark ................ | A41D 13/1236 2/114 |
| 1,092,265 | A * | 4/1914 | Howl ................ | 2/64 |
| 2,144,875 | A * | 1/1939 | Forrest .............. | 2/88 |
| 2,504,534 | A * | 4/1950 | Kephart et al. ...... | 2/114 |
| 2,675,555 | A * | 4/1954 | Peronto ............. | 2/105 |
| 4,258,440 | A * | 3/1981 | McGowan ......... | A41D 13/1236 2/114 |
| 4,382,303 | A * | 5/1983 | Lunt ................ | A41D 13/1236 2/114 |
| 4,745,634 | A * | 5/1988 | Douez ............... | 2/69 |
| 5,553,323 | A * | 9/1996 | Chou et al. ......... | 2/114 |
| 5,603,123 | A * | 2/1997 | Chupa .............. | 2/275 |
| 5,839,793 | A * | 11/1998 | Merrick ............. | A44B 11/006 24/615 |
| 6,401,248 | B1 | 6/2002 | Christensen | |
| 6,408,439 | B1 | 6/2002 | Garforth-Crippen | |
| D490,214 | S * | 5/2004 | Murray-Benoit et al. .... | D2/847 |

(Continued)

*Primary Examiner* — Amy Vanatta
(74) *Attorney, Agent, or Firm* — Kenealy Vaidya LLP

(57) ABSTRACT

A garment can include at least one opening that allows the garment to be opened up such that a restraint mechanism can be easily secured to a user when opened. The at least one opening can include left and right openings that extend from a bottom most periphery of a torso portion and along respective sleeves of the garment. The garment can be combined with a child seat for use in a vehicle. Each of the openings can either extend entirely through an outermost portion of a respective sleeve cuff or be stoppable immediately adjacent the cuff such that the cuff remains in annular form during use. A method for using the garment and system includes placing a user into a seat while the user is wearing the garment and then attaching the restraint mechanism to the user via the at least one opening of the garment.

8 Claims, 5 Drawing Sheets

(56) References Cited

U.S. PATENT DOCUMENTS

| | | | | |
|---|---|---|---|---|
| D512,550 S | * | 12/2005 | Dureus | D2/743 |
| D520,213 S | * | 5/2006 | Dureus | D2/743 |
| 7,047,569 B1 | * | 5/2006 | Mahon | A41D 11/00 2/111 |
| D548,929 S | * | 8/2007 | Dureus | D2/743 |
| 7,431,395 B2 | | 10/2008 | Morgan et al. | |
| 7,987,524 B2 | * | 8/2011 | Bower | A41D 13/1245 2/106 |
| D727,595 S | * | 4/2015 | Lawson et al. | D2/743 |
| D736,498 S | * | 8/2015 | Yadrich | D2/840 |
| 2005/0017566 A1 | | 1/2005 | Rizk | |
| 2006/0220427 A1 | * | 10/2006 | Patrizi | B60N 2/2812 297/250.1 |
| 2007/0033700 A1 | | 2/2007 | Gonya | |
| 2008/0196139 A1 | | 8/2008 | Eng | |
| 2009/0165206 A1 | | 7/2009 | Davis | |
| 2010/0064412 A1 | | 3/2010 | Slutzky | |
| 2010/0244543 A1 | * | 9/2010 | Fine | B60N 2/2812 297/484 |

\* cited by examiner

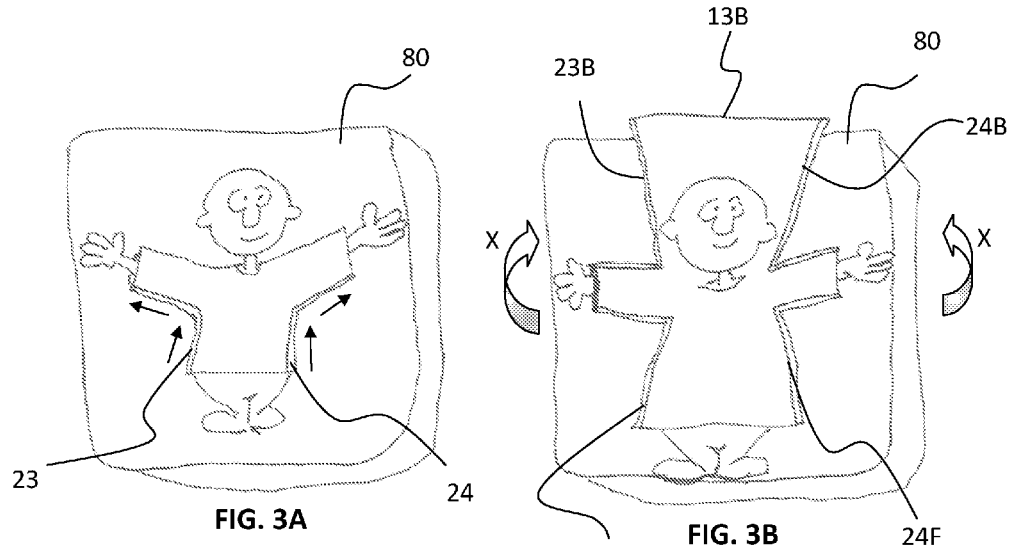
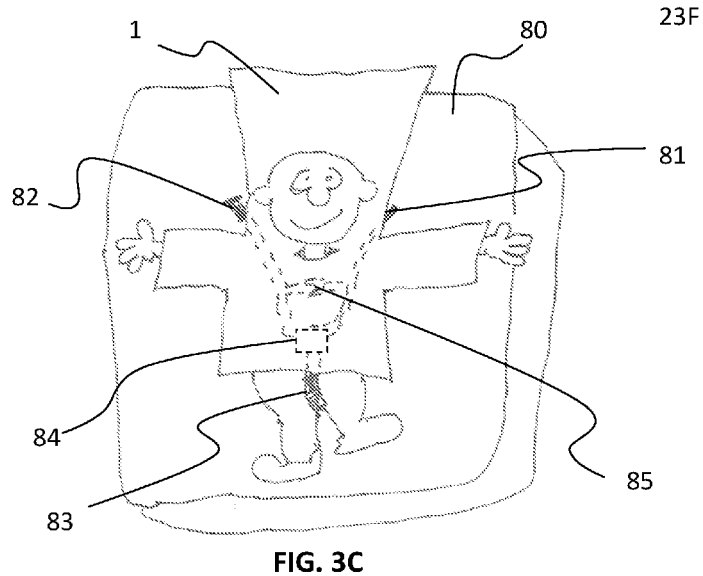

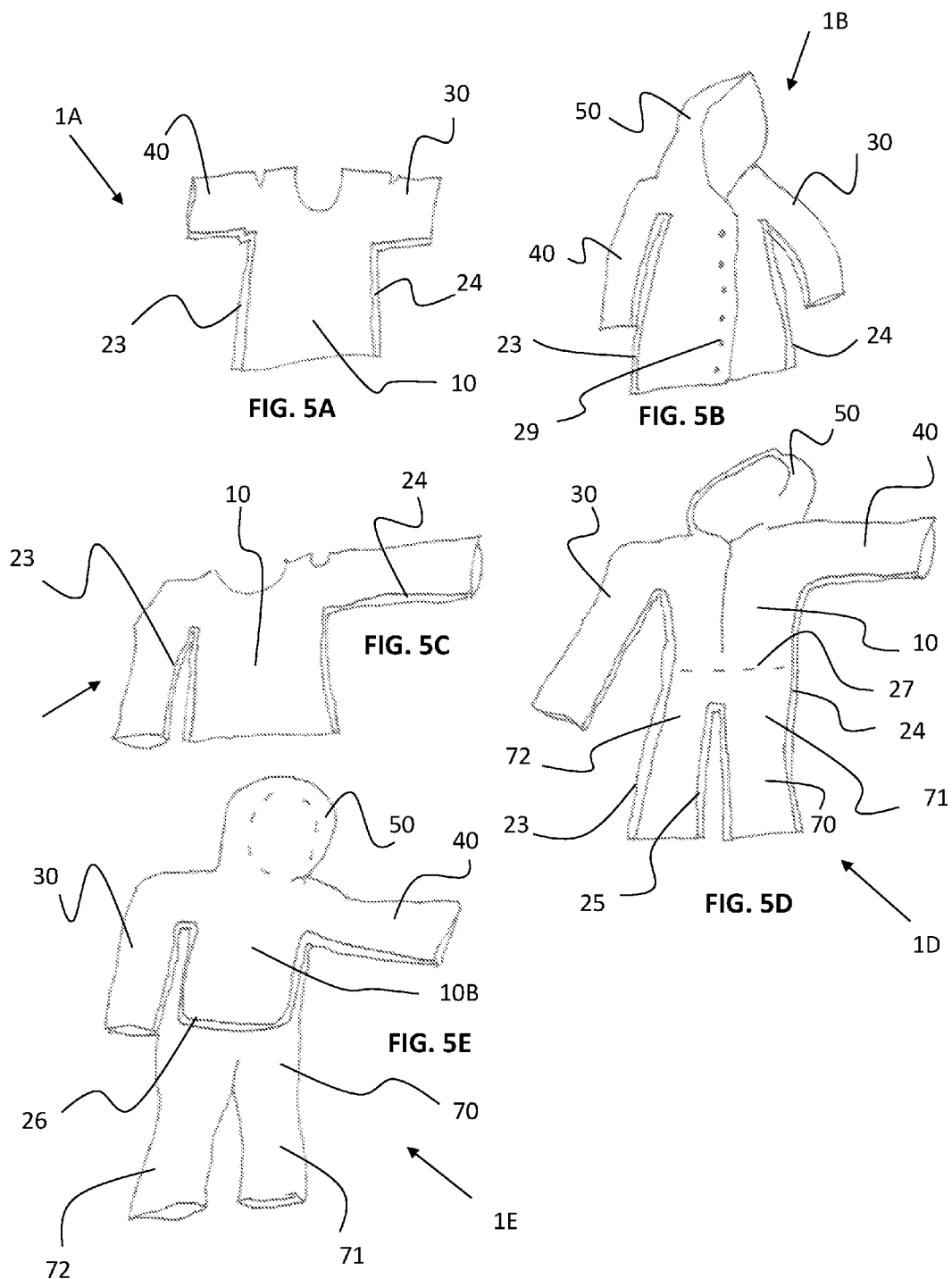

GARMENT, SYSTEM AND METHOD FOR USING THE SAME

BACKGROUND

Description of the Related Art

Garments designed for use with a vehicle seat are commonly used by pilots and race car drivers and include complicated structures that allow for particular features to be present in those garments (e.g., attachments for pneumatic cuffs, attachments for preventing roll, and other restraint type structures). In terms of restraint mechanisms, the main focus in conventional garments was to provide specific access ways that would allow for vehicle restraint mechanisms to pass through. Little consideration has been given to aesthetics or ease of operation.

Furthermore, the amount of work and convenience relative to a parent or guardian who is using the garment in cooperation with a restraint device for a vehicle seat for securing a child, patient or other subject while travelling in a vehicle has not been properly addressed in conventional garments. Nor has the utility of keeping a coat on while providing proper safety belt harnessing to a user been contemplated.

Accordingly, there is a need for a garment that can be used in conjunction with a vehicle restraint system that is both easy to use for a user, parent or guardian, etc., and is simple enough to be incorporated into normal style outerwear, such as coats, jackets, sweaters, hoodies, snowsuits, raincoats, etc. In addition, there is a need for a garment that provides proper safety belt harnessing of the user while keeping the garment substantially in place. There is also a distinct need for a garment that facilitates the proper and appropriate securing of the user within a vehicle seat.

SUMMARY

According to an aspect of the disclosed subject matter, a method for securing a user in a vehicle seat having safety belts can include providing an outerwear garment. The garment can include a torso portion including a head aperture, a torso body portion, and a shoulder portion, wherein the torso body portion is formed as a tubular structure with a bottom end and a top end opposite to the bottom end, the torso body portion includes a front torso portion opposed to a back torso portion, the head aperture is located at the top end, and the shoulder portion lies intermediate the head aperture and the torso body portion, a left arm aperture located at a left side of the torso body portion and a right arm aperture located at a right side of the torso body portion, wherein the head aperture is larger than the left arm aperture and the right arm aperture, a right closure structure extending from an outermost extent of the bottom end of the torso body portion and along the right side of the torso body portion to a location adjacent the right arm aperture, the right closure structure thus configured to repeatedly connect and disconnect the front torso portion of the torso body portion with the back torso portion of the torso body portion. A left closure structure can extend from an outermost extent of the bottom end of the torso body portion and along the left side of the torso body portion to a location adjacent the left arm aperture, the left closure structure thus configured to repeatedly connect and disconnect the front torso portion of the torso body portion with the back torso portion of the torso body portion such that when both the left closure and right closure are completely disconnected, the torso body portion is converted from the tubular structure to a sheet structure folded over on itself at the shoulder portion such that the front torso portion can move relative to the back torso portion and the tubular structure of the torso body portion is broken. The method can include placing the outerwear garment on the user, placing the user in the vehicle seat, disconnecting the left closure structure and the right closure structure such that the tubular structure of the torso body portion is broken and the torso body portion is converted from the tubular structure to the sheet structure including the front torso portion and the back torso portion. The method can further include moving the back torso portion away from the user and away from the front torso portion, and securing the user to the vehicle seat with the safety belts.

According to another aspect of the disclosure, a method for securing a user in a vehicle seat having safety belts can include providing an outerwear garment including, a torso portion having a head aperture, a torso body portion, and a shoulder portion, wherein the torso body portion is formed as a tubular structure with a bottom end and a top end opposite to the bottom end. The torso body portion can include a front torso portion opposed to a back torso portion. The head aperture can be located at the top end, and the shoulder portion can lie intermediate the head aperture and the torso body portion. A left arm aperture and a right arm aperture can be provided, wherein the head aperture is larger than the left arm aperture and the right arm aperture, and a diameter of the torso body portion is larger than the head aperture. The torso body portion can have a left side adjacent the left arm aperture, and a right side adjacent the right arm aperture. A right closure structure can extend from an outermost extent of the bottom end of the torso body portion and along the right side of the torso body portion to a location adjacent the right arm aperture, the right closure structure thus configured to repeatedly connect and disconnect the front torso portion of the torso body portion with the back torso portion of the torso body portion. A left closure structure can extend from an outermost extent of the bottom end of the torso body portion and along the left side of the torso body portion to a location adjacent the left arm aperture, the left closure structure thus configured to repeatedly connect and disconnect the front torso portion of the torso body portion with the back torso portion of the torso body portion such that when both the left closure and right closure are completely disconnected, the torso body portion is converted from the tubular structure to a sheet structure folded over on itself at the shoulder portion such that the front torso portion can move relative to the back torso portion and the tubular structure of the torso body portion is broken. The method can include placing the outerwear garment on the user, and placing the user in the vehicle seat. The method can also include disconnecting the left closure structure and the right closure structure such that the tubular structure of the torso body portion is broken and the torso body portion is converted from the tubular structure to a sheet structure including the front torso portion and the back torso portion. The method can also include moving the front back portion away from the child and away from the front torso portion, and securing the user to the vehicle seat with the safety belts.

According to another aspect of the disclosed subject matter, the method can further include placing the front torso portion adjacent the child and over the child safety belts, at least partially connecting the left closure structure, and at least partially connecting the right closure structure.

According to another aspect of the disclosed subject matter, the method can further include disconnecting the left closure structure and the right closure structure such that the only aperture existing in the entire outerwear garment is the head aperture.

According to yet another aspect of the disclosed subject matter, the method can further include providing a left tubular sleeve structure extending from the torso body portion and terminating at the left arm aperture, wherein the left closure structure extends completely through the left tubular sleeve structure and through the left arm aperture and is thus configured to repeatedly connect and disconnect such that the left tubular sleeve structure is converted between a tubular structure and a substantially sheet structure. The method can also include providing a right tubular sleeve structure extending from the torso body portion and terminating at the right arm aperture, wherein the right closure structure extends completely through the right tubular sleeve structure and through the right arm aperture and is thus configured to repeatedly connect and disconnect such that the left tubular sleeve structure is converted between a tubular structure and a substantially sheet structure. Disconnecting the left closure structure and the right closure structure can include converting the left tubular sleeve structure from a tubular structure to a substantially sheet structure and converting the right tubular sleeve structure from a tubular structure to a substantially sheet structure.

According to still another aspect of the disclosed subject matter, disconnecting the left closure structure can include unzipping a zipper that extends from the outermost bottom portion of a torso aperture completely through the left arm aperture such that the left arm aperture is broken and no left arm aperture exists after unzipping and no left arm tubular structure exists after unzipping.

According to another aspect of the disclosed subject matter, disconnecting the left closure structure can include unzipping a zipper that extends from a torso aperture completely through the left arm aperture such that the left arm aperture is broken and no left arm aperture exists after unzipping.

According to yet another aspect of the disclosed subject matter, disconnecting can include disconnecting the left closure structure and the right closure structure such that a torso aperture, the right arm aperture, and the left arm aperture are all broken.

According to a further aspect of the disclosed subject matter, the method can include providing a closure structure stop located adjacent at least one of the right arm aperture and the left arm aperture such that a respective one of the right closure structure and left closure structure is prevented from breaking at least one of the right arm aperture and the left arm aperture, respectively.

According to another aspect of the disclosed subject matter, providing a closure structure stop can include providing a strip of hook material and a strip of loop material located adjacent at least one of the first arm aperture and the second arm aperture.

According to still another aspect of the disclosed subject matter, the method can further include providing a left tubular sleeve structure extending from the torso body portion and to an outermost left sleeve collar, wherein the left closure structure extends through the left tubular sleeve structure and terminates at the left sleeve collar and is configured to repeatedly connect and disconnect such that the left tubular sleeve structure is converted between a tubular structure and a substantially sheet structure joined at an end by the left sleeve collar. The method can also include providing a right tubular sleeve extending from the torso body portion and to an outermost right sleeve collar, wherein the right closure structure extends through the right tubular sleeve structure and terminates at the right sleeve collar and is configured to repeatedly connect and disconnect such that the right tubular sleeve structure is converted between a tubular structure and a substantially sheet structure joined at an end by the right sleeve collar. The method can include removing the child's right hand through the right sleeve collar, and removing the child's left hand through the left sleeve collar, wherein securing includes securing the child to the child car safety seat with the child safety belts after the child's right hand and left hand are removed through the right and left sleeve collars, respectively.

According to another aspect of the disclosed subject matter, the method can further include providing a closure structure stop located adjacent at least one of a tubular right sleeve collar and tubular left sleeve collar such that a respective one of the right closure structure and left closure structure is prevented from breaking the tubular configuration of the right sleeve collar and the left sleeve collar, respectively.

According to another aspect of the disclosed subject matter, providing a closure structure stop can include providing a strip of hook material and a strip of loop material located adjacent at least one of the right sleeve collar and the left sleeve collar.

According to another aspect of the disclosed subject matter, the garment can be formed as a snowsuit and can further include a left leg portion and a right leg portion extending from the torso body portion, and the left closure structure and right closure structure can be joined together providing a single front closure structure that extends continuously from the right arm aperture to the left arm aperture and across the torso body portion.

According to another aspect of the disclosed subject matter directed to a first embodiment of an outerwear garment, the garment can include a torso portion including a left arm aperture, a right arm aperture, a head aperture, and a torso aperture, wherein the head aperture is larger than the left arm aperture and the right arm aperture, and the torso aperture is larger than the head aperture, and the torso aperture has a left side aligned with and opposed to the left arm aperture, and a right side aligned with and opposed to the right arm aperture. The torso portion can be formed as a tubular structure with the torso aperture located at a bottom end, and the right arm aperture, the head aperture, and the left arm aperture located at a top end opposed to the bottom end. The torso portion can further include a front torso portion opposed to a back torso portion. A right closure structure can extend from and completely through the right side of an outermost bottom portion of the torso aperture to a location that extends completely through an outermost distal portion of the right arm aperture, the right closure structure thus configured to repeatedly connect and disconnect the front portion of the torso portion with the back portion of the torso portion. A left closure structure can extend from and completely through the left side of an outermost bottom portion of the torso aperture to a location that extends completely through an outermost distal portion of the left arm aperture, the left closure structure thus configured to repeatedly connect and disconnect the front portion of the torso portion with the back portion of the torso portion such that when both the left closure and right closure are completely disconnected, the torso portion is converted from the tubular structure to a sheet structure connected by a shoulder portion in which the front portion of the torso portion is movable relative to the back portion of the torso portion, and the tubular structure of the torso portion is broken.

According to another aspect of the disclosed subject matter, at least one of the left closure structure and the right closure structure can include a plurality of buttons and a corresponding plurality of button holes.

According to still another aspect of the disclosed subject matter, at least one of the left closure structure and the right closure structure includes a zipper structure or a hook and loop structure.

According to yet another aspect of the disclosed subject matter, at least one of the left closure structure and the right closure structure includes a plurality of snap fasteners.

According to another aspect of the disclosed subject matter, the garment can include a hood located at the head aperture.

According to a further aspect of the disclosed subject matter, the garment can be formed as one of a sweater, a shirt, a rainjacket, and a winter jacket.

According to another aspect of the disclosed subject matter, a child safety restraint system can include an outerwear garment according the first embodiment described above, and a child car safety seat including a back rest, a seat bottom connected to the back rest, and a safety belt system connected to at least one of the backrest and the seat bottom.

According to another aspect of the disclosed subject matter, a method for assembling an outerwear garment can include providing a torso portion including a left arm portion, a right arm portion, a head aperture portion, and a torso aperture portion having a left side and a right side, the torso portion further including a front torso portion and a back torso portion. The method can further include attaching a right closure structure to the garment such that the right closure structure extends from the right side of the torso aperture portion to the right arm portion of the torso portion, and attaching a left closure structure to the garment such that the left closure structure extends from the left side of the torso aperture portion to the left arm portion of the torso portion. Wherein, when the left closure structure and the right closure structure are attached and are each in a closed position, the garment includes a head aperture, a torso aperture, a left arm aperture and a right arm aperture. Further, the head aperture can be larger than the left arm aperture and the right arm aperture, and the torso aperture can be larger than the head aperture, and the torso aperture can have a left side aligned with and opposed to the left arm aperture, and a right side aligned with and opposed to the right arm aperture. The torso portion can be formed as a tubular structure when the left closure structure and the right closure structure are attached and are in the closed position, with the torso aperture located at a bottom end of the tubular structure, and with the right arm aperture, the head aperture, and the left arm aperture located at a top end opposed to the bottom end of the tubular structure. The left closure structure can extend from and completely through an outermost bottom portion of the left side of the torso aperture to a location that extends completely through an outermost distal portion of the left arm aperture, and the right closure structure can extend from and completely through an outermost bottom portion of the right side of the torso aperture to a location that extends completely through an outermost distal portion of the right arm aperture. The left and right closure structures can thus be configured to repeatedly connect and disconnect the front torso portion with the back torso portion such that when both the left closure and right closure structures are completely opened/disconnected, the torso portion is converted from the tubular structure to two sheet structures connected by a shoulder portion, such that the two sheet structures are movable relative to each other and the tubular structure of the torso portion is broken.

According to yet another aspect of the disclosed subject matter, at least one of the left closure structure and the right closure structure can include a plurality of buttons and a corresponding plurality of button holes.

According to yet another aspect of the disclosed subject matter, at least one of the left closure structure and the right closure structure can include a zipper structure.

According to still another aspect of the disclosed subject matter, at least one of the left closure structure and the right closure includes a plurality of snap fasteners.

According to a further aspect of the disclosed subject matter, the method can also include providing a right sleeve structure and a left sleeve structure, wherein the right arm aperture and left arm aperture are each located at an outermost extent of the right sleeve structure and left sleeve structure, respectively, and the left sleeve structure is formed as a tubular structure when the left closure structure is closed/connected, and the right sleeve structure is formed as a tubular structure when the right closure structure is closed/connected.

According to yet another aspect of the disclosed subject matter, the method can also include providing a hood adjacent the head aperture portion.

BRIEF DESCRIPTION OF THE DRAWINGS

The disclosed subject matter of the present application will now be described in more detail with reference to exemplary embodiments of the apparatus, system and method, given by way of example, and with reference to the accompanying drawings, in which:

FIGS. 3A-C are explanatory sequential views showing an exemplary method of use of the garment of FIG. 1;

FIGS. 5A-E are perspective views of different embodiments of a garment made in accordance with principles of the disclosed subject matter, including a short sleeve vest; a raincoat; a sweater; a first snowsuit; and a second snowsuit.

DETAILED DESCRIPTION OF EXEMPLARY EMBODIMENTS

Figure 1:
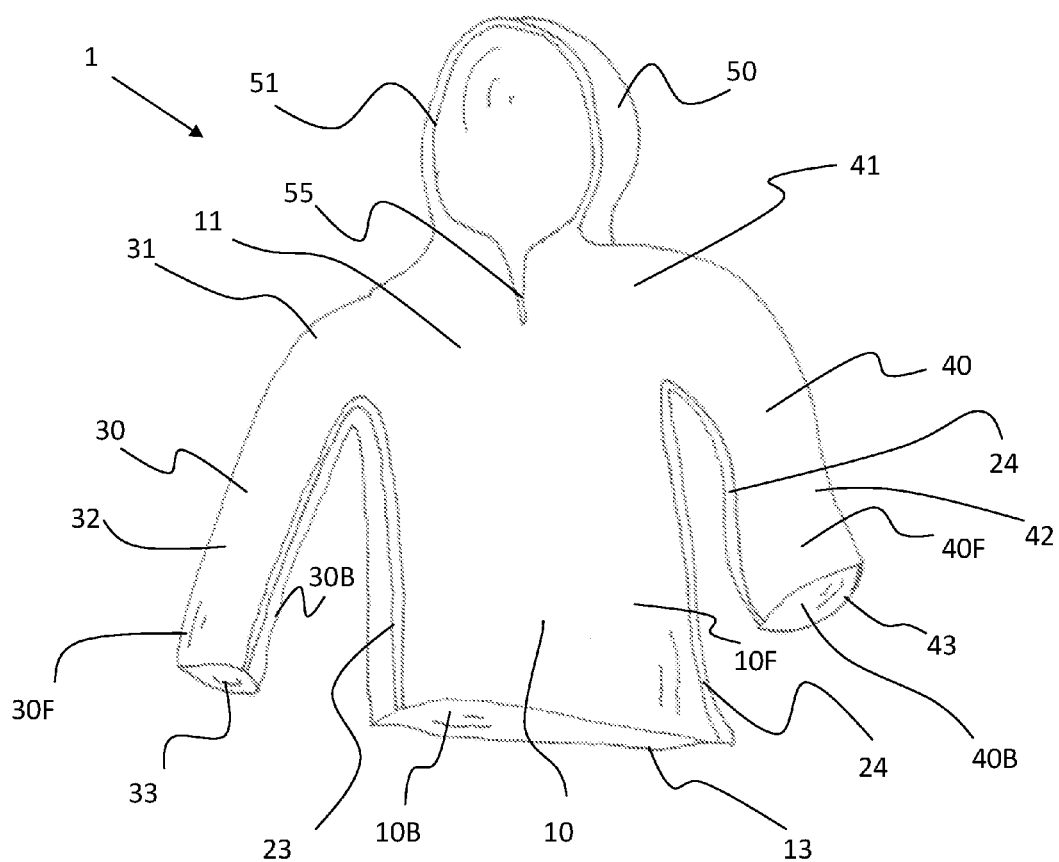
FIG. 1 is a perspective schematic view of an exemplary garment made in accordance with principles of the disclosed subject matter.

FIG. 1 illustrates a perspective schematic view of an exemplary garment 1 made in accordance with principles of the disclosed subject matter. The garment 1 includes a torso portion 10 that connects with (or continues into) a right arm portion 30 and a left arm portion 40.

The torso portion 10 can include a front torso portion 10F and a back torso portion 10B. The upper portion 11 of the torso portion 10 connects with a right shoulder portion 31 of the right arm 30 as well as with a left shoulder portion 41 of the left arm 40. A head aperture 51 is located near the upper portion 11 and can include a hood 50 secured adjacent to the head aperture 51. A torso aperture 13 can be located opposed to the head aperture 51 and at a lowermost portion of the torso portion 10.

The right arm 30 extends from a right shoulder portion 31 to a right arm aperture 33 located at the outermost distal extent of the right arm portion 30. As viewed in FIG. 2, the right arm aperture 33 can be defined by the right arm edge 33E. Similarly, left arm 40 extends from the left shoulder portion 41 to a left arm aperture 43 located at the outermost distal extent of the left arm portion 40. As viewed in FIG. 2, the left arm aperture 43 can be defined by the left arm edge 43E. Thus, the garment 1 includes four main apertures: a head aperture 51, a right arm aperture 33, a left arm aperture 43, and a torso aperture 13.

Each of the arms (right arm 30, left arm 40) can include a respective sleeve portion (right sleeve portion 32, left sleeve portion 42). In addition, for purposes of facilitating description of the use of the garment, the right arm 30 can include a right arm front portion 30F and right arm back portion 30B. The left arm 40 can include a left arm front portion 40F and left arm back portion 40B.

Figure 2:
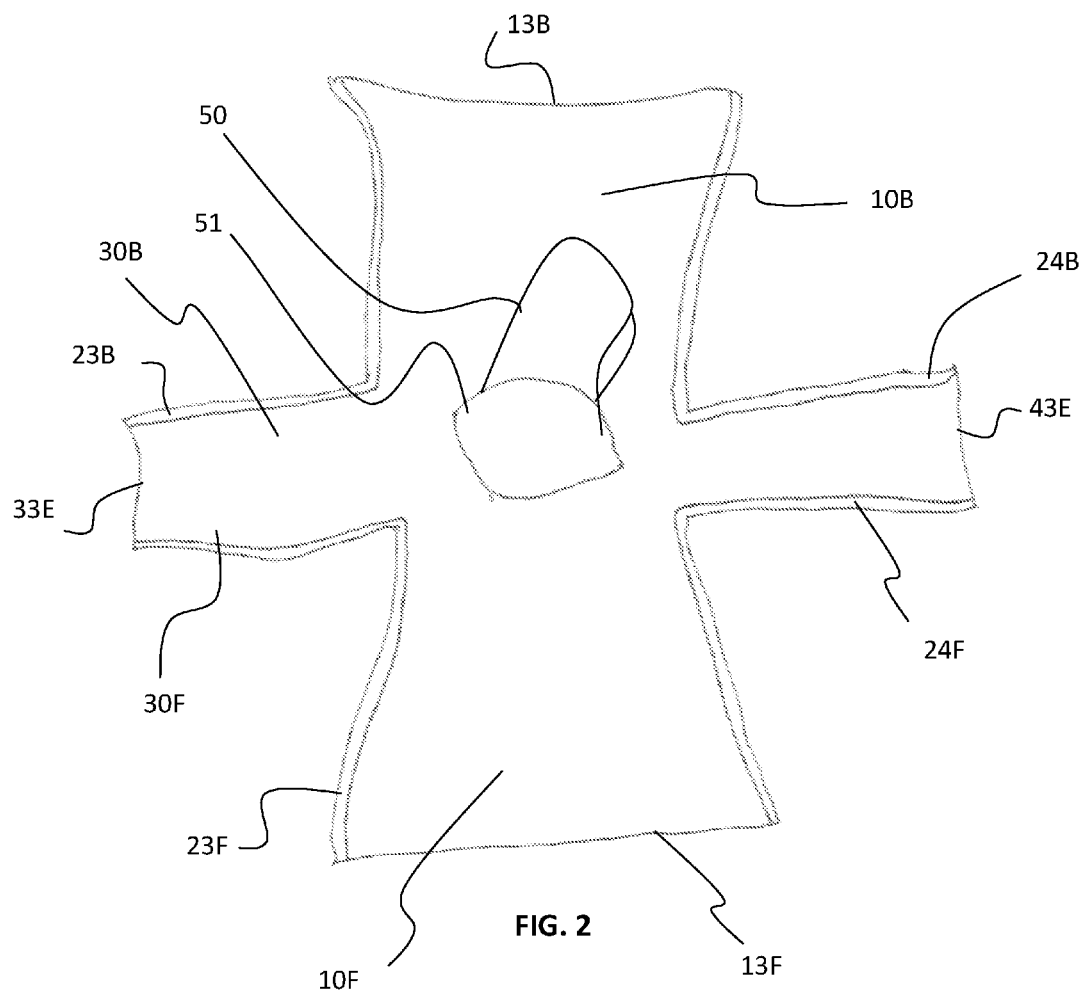
FIG. 2 is a perspective schematic view of the exemplary garment of FIG. 1 in a fully opened state.

A right closure structure 23 can be formed in the garment 1 extending from right arm aperture 33 along the right sleeve 32 down a right side of the torso portion 10 and then completely through a peripheral lowermost extent of the garment. In FIG. 1, the peripheral lowermost extent of the garment is the torso aperture 13, which can be defined by the back and front torso edges 13B, 13F (FIG. 2). The closure structure 23 can be formed as a zipper mechanism with the zipper start 28 located at the torso aperture 13 when the closure structure 23 is located in the fully closed position as shown in FIG. 1. Alternatively, the closure structure 23 can be formed as a series of buttons or snaps, a hook and loop closure, a series of magnets, or other closure structure that runs along a side of the torso portion 10 and then continuously extends through the arm 30 to the right arm aperture 33. A left closure structure 24 can be located on the left side of the torso portion 10 and the left arm 40. The left closure structure 24 can be formed in any manner described above with respect to the right closure structure 23 and can be of the same type or of a different type as compared to the right closure structure 23.

FIG. 2 is a perspective schematic view of garment 1 in a fully opened state. When the closure structure 23 is in the fully opened condition, the torso portion 10 will no longer be formed as a tubular portion and, instead, will include two sheet-like structures: torso back portion 10B and torso front portion 10F. In this condition the torso front portion 10F is able to unfold upward relative to the torso back portion 10B along the upper torso portion 11 and/or shoulder portions 31 and 41. In addition, when in the fully opened state, the right sleeve 32 and left sleeve 42 will no longer be formed as a tubular structure and, instead, the front portion 30F and back portion 30B may become formed as a continuous sheet-like structure. In the embodiment shown in FIG. 1, the right closure structure 23 extends completely through the right arm aperture 33 such that the entire right arm portion 30 is changed from a tubular structure to a single sheet-like structure. When the right closure structure 23 is in the completely opened state, the right closure structure 23 will be separated into a front right closure structure 23F and a back right closure structure 23B. For example, when formed as a zipper, the front right closure structure 23F and back right closure structure can simply comprise mating zipper portions. The beginning segment of the zipper can be located at either the outermost extent of the right arm portion 30 (e.g., the right arm aperture 33) or the lowermost peripheral extent of the torso portion 10 (e.g., the torso aperture 13).

When the left closure structure 24 is in the completely opened state, the left closure structure 24 will be separated into a front left closure structure 24F and a back left closure structure 24B. When formed as a zipper, the beginning segment of the zipper can be located at either the outermost extent of the left arm portion 40 (e.g., the left arm aperture 43) or the lowermost peripheral extent of the torso portion 10 (e.g., the torso aperture 13).

When both the left and right closure structures 23 and 24 are in the completely opened state, and the front torso portion 10F is unfolded away from the back torso portion 10B, the garment 1 may resemble a cross formation that includes an opening (head aperture 51) located at an approximate center of the cross shape. Thus, construction of the garment can be accomplished in a relatively straightforward and easy manner, and both use and storage of the garment 1 can be facilitated by the relatively simple design of this particular embodiment. It should be noted that the garment 1 can include several panels of fabric or other material that are sewn or otherwise attached together to form the final shape of the garment 1 (for example, cross shape as shown in FIG. 2). Thus, the garment 1 can be better tailored to an individual user or body type.

FIGS. 3A-C are explanatory sequential views showing an exemplary method of use of the garment 1. In FIG. 3A, a user, such as an infant, child, or physically impaired individual can be placed in vehicle car seat 80 while wearing the garment 1. At this point in time, the garment 1 is in the fully closed position such that the torso portion 10 is in a tubular shape, and each of the right arm 30 and left arm 40 are in a tubular shape. Once the user is placed in the vehicle seat 80, either the user or another party such as a parent or guardian can then open each of the right closure structure 23 and the left closure structure 24. Once the right closure structure 23 and the left closure structure 24 are in the fully opened position, the torso back portion 10B can be moved relative to the torso front portion 10B as shown by arrows X in FIG. 3B. During this procedure, the user's head can remain extending through head aperture 51. The torso back portion 10B can be rotated, slid, pulled, or otherwise moved relative to both the torso front portion 10F and the user such that after the movement, the torso back portion 10B extends upward above the user's head and can be placed or even locked to the vehicle seat 80 above the user. The right sleeve 32 and left sleeve 42 should automatically unfurl from a tubular structure configuration to a single sheet structure during this process (after the right and left closure structures 23, 24 are opened). However, in certain circumstances, it may be necessary to unfurl the right sleeve 32 and the left sleeve 42. In the embodiment shown in FIG. 3B, the entire continuous length of the right sleeve 32 and the left sleeve 42 are opened such that no tubular portion exists after the right closure structure 23 and left closure structure 24 are placed in the fully opened position. However, as described in more detail below, the right sleeve 32 and the left sleeve 42 may still include a short tubular portion that exists after the right closure structure 23 and left closure structure 24 are placed in the fully opened position. Thus, in such a case, a user or third party can also withdraw the user's left and right hand from the short tubular portion that exists at the end of the right sleeve 32 and the left sleeve 42, respectively. In other words, the user's hands can be drawn back through the sleeve cuff such that no portion of the garment 1 encircles any portion of the user's body at that point in time when movement of the torso back portion 10B is completed.

At this time, as shown in FIG. 3C, the user or a third party can then place the straps provided with the vehicle seat 80 (such as a children's car seat) about the user to secure the user to the vehicle seat in accordance with appropriate rules, regulation and laws respective of the use of the vehicle seat 80. In particular, the users' left and right arm can be inserted through the top left strap 81 and top right strap 82, respectively. Then, a chest buckle 85 can be connected to attach the left strap with the right strap 82 in front of the user's chest. A bottom leg strap 84 can be brought between the user's legs and connected to a waist buckle system 83 located below the chest buckle 85. These straps and buckles can all then be tightened to tightly secure the user in the vehicle seat 80. It should be noted that the garment 1 can be configured at this stage of the method to allow the straps and buckles of the vehicle seat 80 to either directly contact the user or contact the user via only the user's lightweight outerwear (and not through a winter weight jacket or bulky sweater, etc.). In addition, it should be noted that because the torso back portion 10B has been moved away from the user, the user's back will be in direct contact with the vehicle seat. Such a configurations facilitates the proper and appropriate securing of the user within the vehicle seat 80.

Finally, as shown in FIG. 3C, the torso back portion 10B can extend above a user's head such that the garment 1 is configured as a substantial cross-shape. If desired, the torso back portion 10B can include a separate securing device, or the vehicle seat can include a mating securing device that attaches to left and right back closure structures 23B, 24B, so that the garment 1 can be attached to the vehicle seat 80 and provide an extra amount of insulation to the user while being transported in the vehicle seat 80. In order to remove the user from the vehicle seat 80, the user or a third party can access the vehicle seat's straps 81, 82, 83, and buckles 84, 85 underneath the garment 1. The user or a third party can then remove the user from the vehicle seat 80 and again return the left closure structure 24 and right closure structure 23 to a fully (or partially) closed state to allow the user to operate the garment 1 in accordance with its intended purpose (i.e., raincoat, winterjacket, snowsuit, pajamas, sweater, etc.)

Figure 4A:
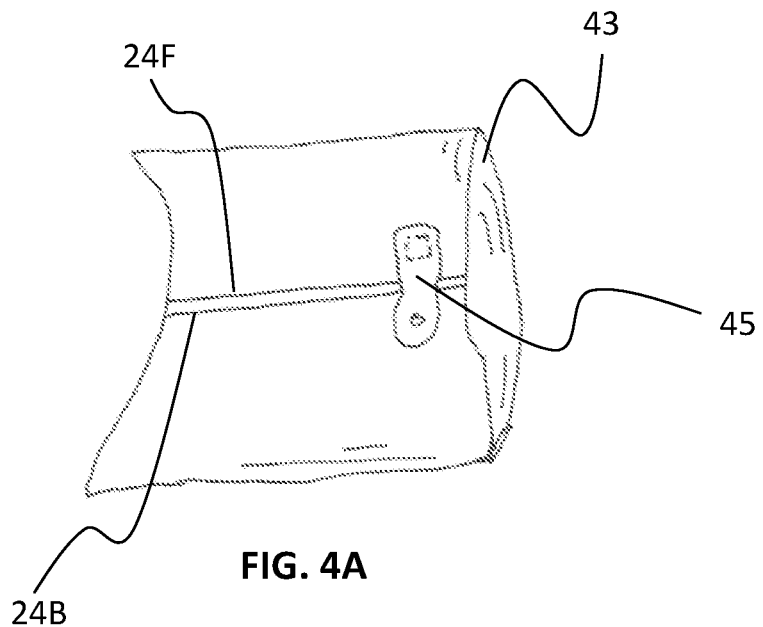
FIGS. 4A and B are partial perspective views of different embodiments of a sleeve according to the disclosed subject matter.

FIGS. 4A and B are partial perspective views of different embodiments of a sleeve according to the disclosed subject matter. FIG. 4A depicts an outermost distal extent of a left sleeve 42 that includes a closure stop 45 configured to selectively prevent a user or third party from completely opening the left closure structure 24. The stop 45 can be formed in many various and different ways so long as it selectively stops the left closure structure 24 from opening to a degree that would fully break the tubular configuration of the left sleeve 42 along its entire extent. In other words, when the closure structure 24 is formed as a zipper, the stop 45 would prevent the zipper from opening all the way to the distal peripheral portion of the sleeve aperture. Thus, a short cuff would remain at the distal end of the sleeve 42 and the user's left hand could remain encircled by that distal end of the sleeve 42. A similar stop 45 could also be provided on the right sleeve portion 32. The stop 45 can provide the user the opportunity to connect into the vehicle seat 80 with the straps as described above while the user's hands or wrists remain encircled by the distal end of the sleeves 32, 42. Thus, the garment 1 remains substantially in place during the process of connection of the user via straps to the vehicle seat 80. In this manner, the closure structures 23B, 23F, 24B, 24F remain substantially aligned and can be easily placed back into the fully or partially closed position.

Figure 4B:
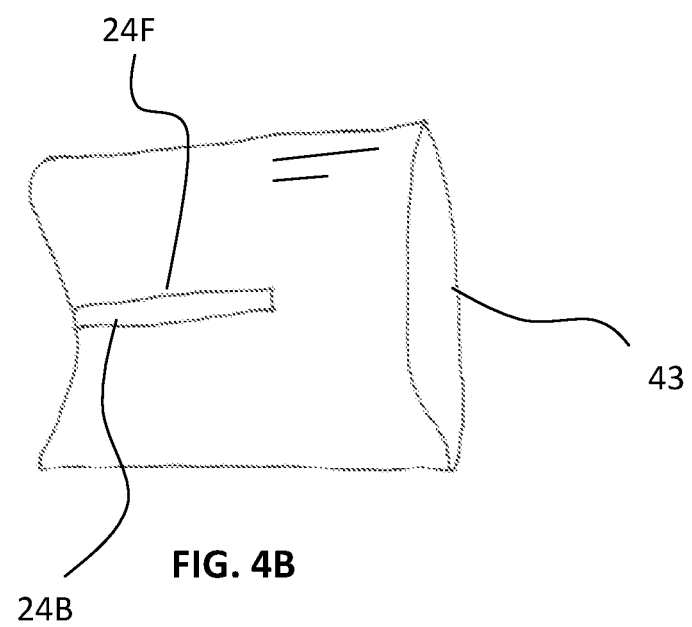

FIG. 4B depicts an outermost distal extent of a left sleeve 42 that includes a left closure structure 24 that ends prior to intersecting with an outermost distal periphery of the arm aperture 43. In particular, the sleeve cuff includes a left closure structure 24B and 24F that stops prior to the edge of the outermost distal extent that defines the left arm aperture 43. The stop in the left closure structure 24 allows the outermost or cuff portion of the sleeve 42 to remain encircled about a user's wrist during operation of the garment 1. Thus, unlike the embodiment shown in FIG. 4A which selectively prevents a user or third party from completely opening the left closure structure 24, the embodiment of FIG. 4B will always prevent a user or third party from completely opening the left closure structure 24. The configuration of the left closure structure 24 in FIG. 4B can be formed in many various and different ways so long as it stops the left closure structure 24 from opening to a degree that would break the tubular configuration of the left sleeve 42 along its entire extent. In other words, when the closure structure 24 is formed as a zipper, the zipper would end short of the outermost distal peripheral portion of the sleeve cuff. Thus, a short cuff would remain at the distal end of the sleeve 42 and the user's left hand could remain encircled by that distal end of the sleeve 42. A similar closure structure 23 could also be provided on the right sleeve 32. The configuration provides the user the opportunity to connect into the vehicle seat with the straps as described above while the user's hands or wrists remain encircled by the distal end of the sleeves 32, 42. Thus, the garment 1 remains substantially in place during the process of connection of the user via buckles or straps to the vehicle seat 80. In this manner, the closure structures 23B, 23F, 24B, 24F remain substantially aligned and can be easily placed back into the fully closed or partially closed position.

FIGS. 5A-E are perspective views of different embodiments of a garment made in accordance with principles of the disclosed subject matter, including a short sleeve shirt; a raincoat; a sweater; a first snowsuit; and a second snowsuit.

FIG. 5A shows a garment 1A that includes a torso portion 10 joined with two short arm portions 30 and 40. A right closure structure 23 and a left closure structure 24 run along opposite and lateral sides of the torso portion 10 of the garment 1A, and extends and intersect with edges of the outermost distal extents that define the apertures 33, 43 of the arms 30, 40, respectively. Thus, the garment 1A can be operated in a similar manner as compared to the garment 1 described above. In addition, it is contemplated that the garment 1A could include no arm portions 30, 40 such that the garment 1A is configured as a vest and the arm apertures 33, 43 are provided on the torso portion 10.

FIG. 5B shows a garment 1B configured as a raincoat that includes a torso portion 10 joined with two arm portions 30 and 40 and includes a hood 50. A right closure structure 23 and a left closure structure 24 run along opposite and lateral sides of the torso portion 10 of the garment 1B, and extends and intersect with the edges of the outermost distal extents that define the apertures 33, 43 of the arms 30, 40, respectively. Thus, the raincoat 1B can be operated in a similar manner as compared to the garment 1 described above. In addition, it is contemplated that the garment 1B could include a central closure structure 29 that runs vertically along a front portion of the torso portion 10 such that the raincoat can be easily taken on and off by a user or third party. The central closure structure 29 can be formed in any manner as described above with respect to the left and right closure structures 23, 24.

FIG. 5C shows a garment 1C configured as a sweater with long sleeves. The garment 1C includes a left closure structure 24 and a right closure structure 23 that each run along respective lateral sides of the torso portion 10 and arm portions 30, 40. The garment 1C can be operated in a similar manner as compared to the garment 1 described above.

FIGS. 5D and 5E depict two different versions of a snowsuit made in accordance with principles of the disclosed subject matter. Garment 1D is configured as a snowsuit including a torso portion 10 a right arm portion 30 and a left arm portion 40. A left closure structure 24 and a right closure structure 23 run along the lateral sides of the torso portion 10 and along the extent of each arm 30 and 40, respectively. The torso portion 10 at the top of the snowsuit extends downward and is joined by a pants portion 70 that continues into a left leg portion 71 and right leg portion 72. The right closure 23 extends continuously along the torso portion 10 through the pants portion 70 via the right leg portion 72 along the lateral side of the snowsuit and finally through the right leg aperture at the edge of the outermost distal extent of the right leg 72. Likewise, the left closure structure 24 extends along the lateral side of the torso portion 10 continuously along the lateral side of the pants portion 70 and the left leg portion 71 until it extends through the aperture at the edge of the outermost distal extent of the left leg 71. The right and left closure structures 23 and 24 can be configured to extend through and break the tubular structure of each of the respective right leg portion 72 and left leg portion 71. Thus, the leg portions 72 and 71 can be opened during operation to allow access for insertion and securing of belt buckles or other car seat straps. In the embodiment shown in FIG. 5D, a center leg closure structure 25 extends along the entire inseam of each leg portion 72 and 71 such that each leg portion 72 and 71 can be separated into two portions: a front portion, and a back portion. Thus, during operation, three different closure structures 23-25 can be opened and closed to allow access to the user within the garment 1D. The center leg closure structure 25 can be formed in any manner as described above with respect to the left and right closure structures 23, 24.

Of course, the center leg closure structure 25 can be optional. In addition, the right closure structure 23 and left closure structure 24 can stop at the waist line of the garment 1D. Thus, only the upper torso portion 10 of the garment 1D would be accessible during operation of the garment 1D. In addition, it is contemplated that a fourth pants closure structure 27 can be provided at the waist line to allow a user to completely separate the pants portion 70 from the torso 10 of the snowsuit.

FIG. 5E shows another embodiment of a garment 1E configured as a snowsuit. In this embodiment, the right closure structure 23 and left closure structure 24 are joined together to form a single closure structure 26 that runs in a substantial U-shape from the edge of the outermost distal extent of the right arm that defines the right arm aperture all the way to the edge of the outermost distal extent of the left arm that defines the left arm aperture. Thus, in operation, a user can be accessed by opening the single closure structure 26 made up of the right and left closure structures such that the right arm 30, left arm 40 and torso portion 10 can all be rotated about the shoulder portion in a similar manner as described above with respect to the embodiment of FIG. 1. However, in this case, the pants portion 70 and right leg portion 72 and left leg portion 71 will remain in place on the user while the upper torso portion 10F is unfolded relative to the back portion 10B. The single closure structure 26 can be formed in any manner as described above with respect to the left and right closure structures 23, 24.

While certain embodiments of the invention are described above, it should be understood that the invention can be embodied and configured in many different ways without departing from the spirit and scope of the invention. For example, the garments as described can be made from many various types of materials, including cloths of cotton, silk, nylon, polyester, polypropylene, blends thereof, and other known materials for making cloth or fabric garments. In addition, the garments can be made from plastic or rubber type materials suitable for raincoats and snow jackets and snowsuits. Other materials are contemplated for use with the disclosed subject matter and include Gore-Tex®, Kevlar®, mesh, Tyvek®, paper, wool, recycled materials, and other materials. The style of garment can vary greatly and can take the form of a shirt, vest, cardigan, sweater, jacket, hoodie, zipfront tracksuit, zipfront jacket, winter jacket, coat, raincoat, snowsuit, T-shirt, safety garment, hospital garment, wind breaker, pajamas, and other various garment configurations that can be used during transportation. The child seat and garment system can include a typical vehicle child car seat that includes a restraint system, for example, two shoulder harnesses, two waste harnesses, and a center leg strap. In one example, the garment(s) are contemplated for use in a five point harness system for a child car seat. However, the garment can be used in other types of vehicle seats including booster seats, adult seats, wheelchair seats, and other seats in which access to a user is desired. When used in a wheelchair seat, the garment 1 can be opened after the user is seated, and the torso back portion 10B can be moved over the back of the wheelchair and possibly attached to the back of the wheelchair. For the purpose of this application, a wheelchair is considered to be a vehicle, such that the seat of the wheelchair is considered to be a vehicle seat.

The garment 1 can also be provided with an insulation insert that provides an extra barrier for the user when the coat is in the opened position. The insulation insert can remain zipped into the garment 1 when the closure structures 23, 24, are in the closed position, or can be removed completely from the garment 1 during use when in the closed position.

It should be understood that each of the separate features disclosed for each of the separate embodiments is/are combinable with other features and embodiments as disclosed above. For example, the closure stop 45 as shown in FIG. 4A can be used with any of the disclosed embodiments as well as other embodiments contemplated by the scope of the disclosed subject matter. In addition, the closure structure can stop prior to the end of each sleeve, as shown in FIG. 4B, in any of the disclosed and contemplated embodiments. Likewise, the configuration of the right closure structure 23 and left closure structure 24 as shown in FIG. 5E can be used in any of the disclosed or contemplated embodiments. For example, a winter jacket can include arm portions 30 and 40 and a torso aperture located just below the single closure structure 26. In other words, the snow suit, of FIG. 5E could be provided without the pants portion and, instead, could include a torso aperture cuff at the lowermost peripheral portion of the torso portion 10. Thus, the torso back portion 10B would remain in position with greater certainty due to the lower torso cuff aperture remaining about the user's torso during operation of the garment. Moreover, the single closure structure 26 can be placed in the fully opened position and the front torso portion 10F can be lifted relative to both the lower torso cuff and the back torso portion 10B to allow access to the user.

Any of the contemplated embodiments can include a closure structure running vertically through the torso portion from the head aperture to the torso aperture. For example, the raincoat depicted in FIG. 5B shows such a closure structure. The closure structure can include buttons, hooks, snaps, magnets, a single zipper, zippers, hook and loop (Velcro®) attachments, seal structures, and other appropriate closure structures.

The method for using the garment disclosed herein can also vary considerably depending on the type of garment being used and the application for which the garment is intended for use. For example, a user or other party may decide not to pull the front torso portion completely over the head of the user (inserting the head of the user through the head aperture of the garment is not always necessary). Instead, the front torso portion 10F can simply be pulled up towards the user's head without going over the user's head during use. In this manner, the seat straps or other securing system can be quickly secured to the user of the garment and the torso portion can then also be quickly reconfigured over the front portion of the user after the straps or other securing mechanism is in place. In addition, when there is a front closure running from the head aperture to the torso aperture of the garment, it will not require the user's head to be placed through the head aperture during use. Instead, the left torso portion and right torso portion including the right arm and the left arm can be lifted up and out-of-the-way while the user or a third-party secures or buckles the straps of the car seat or other vehicle seat to the user.

In yet another embodiment of a method contemplated for use with garments according to the disclosed subject matter, the user can begin the process of opening the closure structures prior to being seated within the vehicle seat, child car seat, or other seat. The beginning and end of the process are not required to take place at any specific location or sequence. However, it is sometimes helpful if the user is in the seated position when the seat straps are buckled or otherwise secured to the user. It should be noted that, although the sleeve cuff is shown as being located at a user's wrist in FIG. 3, it is contemplated that the sleeve cuff can be located anywhere along a users arm and shoulder and still fall within the spirit and scope of the presently disclosed subject matter. If the closure stop structure 45 is provided with the closure structure 23 or 24, the method will not include breaking the arm tube from a complete tubular structure into a separate sheet. Instead, the method may include opening the arm tubular structure and then withdrawing the user's hand through the sleeve cuff in order to secure the straps of the vehicle seat to the user.

If the garment is configured as a snowsuit, the method may include removing the pants from the snowsuit, or opening the closure structure 23-27 such that the entire front portion of the pants can be lifted up and over a user. Alternatively, when using a snowsuit, configured with a single closure structure 26 that is configured in a U-shape, the method can include fully opening the closure structure and moving the front torso portion 10F of the garment up towards the users head. The front torso portion 10F can move relative to both the back torso portion 10B and the leg portions 71, 72 of the snowsuit. In accordance with any of the exemplary method embodiments disclosed herein, the steps of the method are not required to be sequential and can be undertaken in various orders and at various locations with respect to the seat and the vehicle itself.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A child safety restraint system comprising:
   an outerwear garment including,
      a torso portion including a left arm aperture, a right arm aperture, a head aperture, and a torso aperture, wherein the head aperture is larger than the left arm aperture and the right arm aperture, and the torso aperture is larger than the head aperture, and the torso aperture has a left side aligned with and opposed to the left arm aperture, and a right side aligned with and opposed to the right arm aperture, the torso portion is formed as a tubular structure with the torso aperture located at a bottom end, and the right arm aperture, the head aperture, and the left arm aperture located at a top end opposed to the bottom end, the torso portion further including a front torso portion opposed to a back torso portion,
      a right closure structure extending from and completely through the right side of an outermost bottom portion of the torso aperture to a location that extends completely through an outermost distal portion of the right arm aperture, the right closure structure thus configured to repeatedly connect and disconnect the front portion of the torso portion with the back portion of the torso portion, and
      a left closure structure extending from and completely through the left side of an outermost bottom portion of the torso aperture to a location that extends completely through an outermost distal portion of the left arm aperture, the left closure structure thus configured to repeatedly connect and disconnect the front portion of the torso portion with the back portion of the torso portion such that when both the left closure and right closure are completely disconnected, the torso portion is converted from the tubular structure to a sheet structure connected by a shoulder portion in which the front portion of the torso portion is movable relative to the back portion of the torso portion, and the tubular structure of the torso portion is broken,
      wherein the outerwear garment is configured as a winter jacket including an insulation layer; and
   a child car safety seat including a back rest, a seat bottom connected to the back rest, and a safety belt system connected to at least one of the backrest and the seat bottom wherein
   when in use, the back torso portion is located above a topmost portion of the back rest, and the safety belt system includes a first strap located adjacent a first side of the head aperture and between the head aperture and the left arm aperture, a second strap located adjacent a second side of the head aperture and between the head aperture and the right arm aperture, and a third strap extending from a bottom end of the torso portion towards the head aperture, and a first buckle connecting the first and second strap with the third strap, and the first strap, second strap, and third strap are located between the torso portion and the back rest of the child car safety seat such that a child when using child safety restraint system is securely constrained by the safety belt system without an outerwear garment located between the safety belt system and the child.

2. The child safety restraint system of claim 1, further including a second buckle located between and connecting the first strap and the second strap, and the second buckle located above the first buckle and closer to the head aperture than the first buckle.

3. The child safety restraint system of claim 2, wherein, the second buckle is in line with the left and right arm apertures when in use.

4. The child safety restraint system of claim 1, wherein the front torso portion includes a closure structure that extends from the head aperture through the torso aperture at the bottom end of the torso portion,
   wherein the torso portion includes at least one fabric panel, and the outerwear garment is configured as a winter jacket and includes an insulation material such that at least the torso portion is configured as a layered structure including the insulation material and the fabric panel,
   the garment further includes tubular arm portions that each extend to a sleeve cuff, wherein the sleeve cuff is configured to be located at a user's wrist when in use.

5. The child safety restraint system of claim 4, further comprising a hood located adjacent the head aperture.

6. The child safety restraint system of claim 1, wherein at least one of the left closure structure and the right closure structure includes a plurality of buttons and a corresponding plurality of button holes.

7. The child safety restraint system of claim 1, wherein at least one of the left closure structure and the right closure structure includes a zipper structure.

8. The child safety restraint system according to claim 1, wherein at least one of the left closure structure and the right closure structure includes a plurality of snap fasteners.

* * * * *